2,851,334
PROCESS FOR THE PRODUCTION OF A POTASSIUM PERBORATE PRODUCT CONTAINING A HIGH ACTIVE OXYGEN CONTENT

Günther Bretschneider, Frankfurt am Main, Germany, assignor to Deutsche Gold- und Silber-Scheideanstalt, Frankfurt am Main, Germany No Drawing. Application July 26, 1954
Serial No. 445,941
Claims priority, application Germany August 17, 1953
9 Claims. (Cl. 23—60)

The present invention relates to a process for the production of a potassium perborate product having a substantially stoichiometric composition corresponding to the formula, $K_2B_2O_6 \cdot 2H_2O_2$.

A potassium perborate of the formula $K_2B_2O_6 \cdot H_2O$, containing about 15% of active oxygen has in the past been prepared by reacting dilute aqueous potassium metaborate solutions with dilute aqueous hydrogen peroxide and precipitating the perborate with alcohol. Many attempts have also been made to produce potassium perborates having a high active oxygen content of 20% and more. Such perborates would be ascribed the formula $K_2B_2O_6 \cdot 2H_2O_2$ which would theoretically contain 24.2% of active oxygen. In such attempt, concentrated aqueous solutions of hydrogen peroxide were reacted with potassium metaborate solutions and the solution permitted to stand for long periods of time to effect crystallization. In accordance with one of such proposals, the metaborate employed contained an excess of caustic potash. The active oxygen content of the products obtained varied depending upon the reaction conditions and especially upon the excess of hydrogen peroxide employed. For example, in order to obtain the product $KBO_3 \cdot H_2O_2$, the ratio of $KBO_3$ to $H_2O_2$ employed was 1:5 and only 26% of the active oxygen of the $H_2O_2$ is contained in the end product, whereas a decomposition loss of 24% of the active oxygen occurs. On the other hand, when the reactants were employed in the previously known processes so that the ratio of potassium to boron to active oxygen is 1:1:2, products were obtained which contained potassium, boron and active oxygen in a ratio of 1:1:1.8. All of the previously known processes for the production of potassium perborates with a high active oxygen content were such that the molar ratio of potassium borate to the active oxygen of such products was noticeably lower than the active oxygen contained in the reaction solution and, consequently, it was previously not possible to obtain high yields of potassium perborates with reference to the active oxygen contained in the starting materials. In some instances the reaction products were obtained as sticky masses or even viscous oily solutions from which solid crystalline products could only be obtained very slowly and incompletely. The high requirements for concentrated hydrogen peroxide coupled with the inadequate yields, as well as the unpredictability as to the products obtained, have previously prevented the technical production and use of potassium perborate.

It is an object of the present invention to provide a simple and controllable process for the production of potassium perborate with high active oxygen content with good yields.

In accordance with the invention, it was unexpectedly found that, contrary to the teachings of the prior art, it is possible to produce a potassium perborate product having a substantially stoichiometric composition of the formula $K_2B_2O_6 \cdot 2H_2O_2$ without the necessity of employing any substantial excess of hydrogen peroxide. According to the invention, it was found that this result could be achieved by reacting $KBO_2$ and $H_2O_2$ in a molar relationship of 1:2 under such conditions that an excess of $H_2O_2$ is maintained during the major portion of the reaction and at least during the major portion of the mixing of the reaction components. Such excess of $H_2O_2$ which is maintained should correspond to a molar ratio of $KBO_2$ to $H_2O_2$ of at least 1:2.5. When reaction solutions are selected so that, according to the invention, 2 mols of $H_2O_2$ are supplied to the reaction for every mol of $KBO_2$, potassium perborates are obtained whose molar ratio of potassium to boron to active oxygen is 1:1:1.98 to 2.00 in yields of 95% calculated on active oxygen, 97.5% calculated on potassium and 96.5% calculated on boron.

Advantageously the process according to the invention is carried out by first supplying the $H_2O_2$ solution containing at least 20 vol. percent, and preferably 30 to 40 vol. percent, to the reaction vessel and gradually adding the corresponding quantity of a not too dilute a solution of $KBO_2$ to such $H_2O_2$ while stirring intensively. Expediently the $KBO_2$ solution is added dropwise. When following this procedure, the main quantity of potassium perborate is formed under the continuous presence of an excess of $H_2O_2$, while the remainder is formed and crystallized upon longer standing of the reaction mixture.

Generally, the reaction temperature for the process according to the invention should not exceed 40° C. and advantageously is below 30° C. While the reactant solutions are being mixed, the temperature of the reaction solution is preferably maintained above 5° C. and advantageously above 10° C. After all of the $KBO_2$ has been added, the reaction mixture can be gradually cooled to 0° C. and below to promote crystallization of the perborate produced. When the active oxygen content of the reaction solution falls to below 1 g./100 cc., the precipitate is separated from the solution, preferably by centrifuging. It was found that contrary to the processes of the prior art it is not necessary to wash the precipitated perborate. The separated perborate can be dried in air, or better in vacuum, at elevated temperature. The dried product is easily pressed into a very finely divided dusty powder.

It was found advantageous in the production of a product which is easily separated from the reaction solution to carry out the reaction at a pH not in excess of 9. Advantageously potassium metaborate solutions containing a 1 to 4% excess of boric acid are employed so as to control the pH of the reaction mixture.

The potassium perborate produced according to the invention generally has an active oxygen content of 23.5 to 24% and is precipitated as a finely divided product rather than a viscous, difficultly filterable mass. The product, even in unstabilized form has good stability during storage and at elevated temperatures. It is, however possible, in order to increase its so-called "Grünauer" stability, to add known stabilizers, such as magnesium silicates or phosphates such as sodium pyrophosphates, to the reaction components or preferably to the finished product. An especially good stabilizer was found to be a finely divided silica aerogel produced by the thermal decomposition or hydrolysis of volatile silica compounds in the gas phase. Such a silica aerogel can, for example, be produced by decomposing vaporized silicon tetrachloride in the presence of steam at temperatures above 600° C. to form a silica aerosol which, upon cooling, is converted to the aerogel.

The following example will serve to illustrate the process according to the invention:

*Example 1*

640 grams of 86% potassium hydroxide (9.8 mols)

and 622 grams of 99.5% boric acid (10.0 mols) were dissolved in 450 cc. of water. The resulting potassium metaborate solution, after cooling, was gradually introduced over a period of two hours, while stirring, into an aqueous 35 vol. percent $H_2O_2$ corresponding to 20 mols of $H_2O_2$ while maintaining a temperature of 15 to 20° C. The hydrogen peroxide solution had been stabilized with a magnesium silicate solution.. The pH value after completion of the addition of the metaborate solution was 8. Thereafter, while continuing the stirring, the reaction solution was gradually cooled to below 0° C. whereupon the remaining quantities of potassium perborate practically completely precipitated out. After the reaction mixture had stood long enough that the active oxygen content of the solution was less than 1 gram per 100 cc., that is about 15 hours, the precipitate was centrifuged off and the unwashed product was dried at 40 to 50° C. in a vacuum chamber to produce a dry product which was easily pressed to produce a dry dusty finely divided powder.

The decomposition loss of hydrogen peroxide was less than 1%. The yield of potassium perborate on active oxygen was 95% calculated, 96.5% calculated on boron and 97.5% calculated on potassium.

The analysis of the dried product was as follows:

| | Percent |
|---|---|
| K | 29.30 |
| B | 8.13 |
| Act. O | 23.91 |
| $H_2O$ | 14.6 |

The molar relationship of K to B to Act. O to $H_2O$ therefore was 1:1.00:1.995:1.08.

The solubility of the product in water at 20° C. was 0.2 mol/liter. The saturated solution had a pH of 9.5 to 9.7.

After three months storage of the product at room temperature no loss in active oxygen could be ascertained whereas after storage for 10 days at 45° C. the active oxygen content was still more than 99% of that originally present.

*Example 2*

A potassium perborate obtained according to the process of Example 1, but without the addition of magnesium silicate, was mixed with 0.7% of finely divided silica aerogel produced by thermal decomposition of silicium tetrachloride in the gas phase.

After three months storage of the product at room temperature no loss in active oxygen could be observed. After storage for 10 days at 45° C., however, the active oxygen content amounted to 99.2% of that originally present.

*Example 3*

A potassium perborate obtained according to the process of Example 1, but without the addition of magnesium silicate, was mixed with 1% of dehydrated sodium pyrophosphate.

After three months storage of the product at room temperature no loss in active oxygen could be observed. After storage for 10 days at 45° C., however, the active oxygen content amounted to 98.6% of that originally present.

I claim:

1. A process of producing a potassium perborate product essentially composed of a stoichiometric composition $K_2B_2O_6.2H_2O_2$, the molar ratio of potassium to boron to active oxygen in said product being 1:1:1.98–2.00, from aqueous solutions of potassium metaborate and hydrogen peroxide which comprises gradually slowing adding an aqueous potassium metaborate solution to an aqueous solution of hydrogen peroxide containing at least 20 vol. percent of hydrogen peroxide while stirring the reaction mixture, the molar proportion of potassium metaborate to hydrogen peroxide reacted being about 1:2, such slow addition being such that an excess of hydrogen peroxide is present during the major portion of the ensuing reaction, the reaction mixture being maintained at a temperature up to 40° C. and at a pH not exceeding 9, said reaction mixture also being in the absence of alcohol, providing a temperature in said reaction mixture to effect precipitation of the resulting potassium perborate from said reaction mixture and separating such precipitate from the reaction mixture.

2. A process of producing a potassium perborate product essentially composed of a stoichiometric composition $K_2B_2O_6.2H_2O_2$, the molar ratio of potassium to boron to active oxygen in said product being 1:1:1.98–2.00, from aqueous solutions of potassium metaborate and hydrogen peroxide which comprises gradually slowly adding an aqueous potassium metaborate solution to an aqueous solution of hydrogen peroxide containing at least 30 to 40 vol. percent of hydrogen peroxide while stirring the reaction mixture, the molar proportion of potassium metaborate to hydrogen peroxide reacted being about 1:2, such slow addition being such that an excess of hydrogen peroxide is present during the major portion of the ensuing reaction, the reaction mixture being maintained at a temperature up to 40° C. and at a pH not exceeding 9, said reaction mixture also being in the absence of alcohol, providing a temperature in said reaction mixture to effect precipitation of the resulting potassium perborate from said reaction mixture and separating such precipitate from the reaction mixture.

3. A process in accordance with claim 2 in which the temperature of the reaction mixture is maintained between 10 and 30° C.

4. A process in accordance with claim 2 in which the potassium metaborate solution contains a 1 to 4 mol percent excess of boric acid.

5. A process according to claim 2 comprising in addition drying the separated precipitate without washing.

6. A process according to claim 2 in which a stabilizer is admixed with the reaction components.

7. A crystalline potassium perborate product essentially composed of a stoichiometric composition of the formula $K_2B_2O_6.2H_2O_2$, the molar ratio of potassium to boron to active oxygen in said product being 1:1:1.98–2.00.

8. A potassium perborate product composed of a crystalline potassium perborate product essentially composed of a stoichiometric composition of the formula $K_2B_2O_6.2H_2O_2$, the molar ratio of potassium to boron to active oxygen in said crystalline product being 1:1:1.98–2.00, and a stabilizer.

9. A potassium perborate product composed of a crystalline potassium perborate product essentially composed of a stoichiometric composition of the formula $K_2B_2O_6.2H_2O_2$, the molar ratio of potassium to boron to active oxygen in said crystalline product being 1:1:1.98–2.00, and a finely divided silica aerogel obtained in the thermal vapor phase decomposition of a volatile silicon compound as a stabilizer for said crystalline product.

References Cited in the file of this patent

UNITED STATES PATENTS

| 1,716,874 | Carveth | June 11, 1929 |
| 1,978,953 | McKeawn | Oct. 30, 1934 |
| 2,155,704 | Godall et al. | Apr. 25, 1939 |
| 2,491,789 | Young | Dec. 20, 1949 |

FOREIGN PATENTS

| 318,219 | Germany | Jan. 9, 1920 |

OTHER REFERENCES

Gmelin-Kraut: "Handbuch der anorganischen Chemie," 2.1, Heidelberg, 1908, page 151.

Hoffman: Lexicon der Anorganverbindungen," vol I (2nd half) (1919), page 1629.